Jan. 10, 1933.  L. M. CORTIGIANO  1,894,086
AUTOMATIC JACK
Filed May 27, 1931
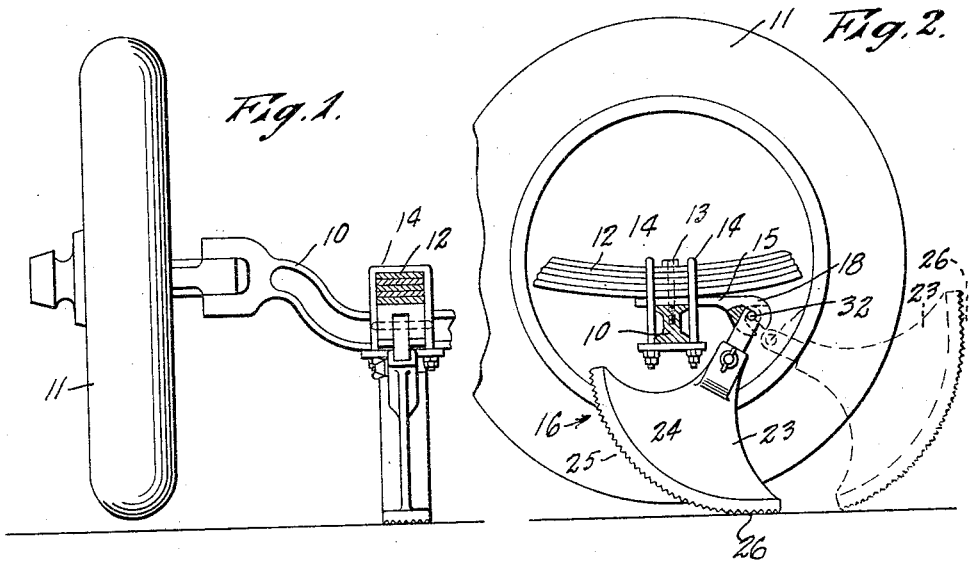
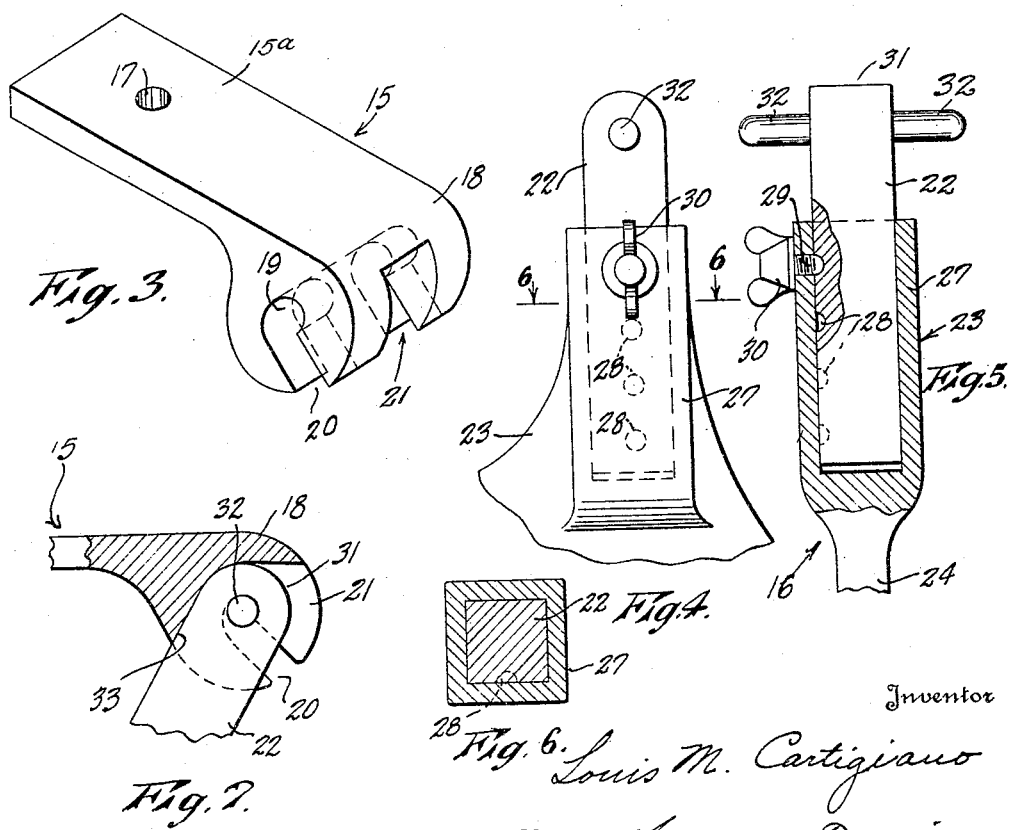
Inventor
Louis M. Cortigiano
By Wooster & Davis
Attorneys Patented Jan. 10, 1933

1,894,086

UNITED STATES PATENT OFFICE

LOUIS M. CORTIGIANO, OF WATERBURY, CONNECTICUT, ASSIGNOR OF ONE-HALF TO PAUL D. HIPPOLITUS, OF BRIDGEPORT, CONNECTICUT

AUTOMATIC JACK

Application filed May 27, 1931. Serial No. 540,250.

This invention relates to new and useful improvements in automatic jack for motor vehicles.

An object of the invention is to provide a motor vehicle jack adapted to be easily applied to a vehicle and adapted to elevate or raise a wheel of the vehicle on the vehicle being driven forwardly or rearwardly a slight distance.

Another object is to provide a jack as stated and including improved means adapted to be permanently attached to a vehicle and form part of the jack when the jack is in use, the said jack including a part easily attachable to the said means when a wheel of the vehicle is to be raised, one of said parts including an adjustable feature adapting the jack for use with wheels of different diameters.

A further object is to provide a vehicle jack including two parts, of which one is permanently attached to a vehicle and of which the other is adapted to be attached to the first part for use and removed therefrom after use, the said parts having relative movement as they co-act to raise or lower a wheel of a vehicle, and said parts including co-operating portions adapted to engage and limit relative movement between the parts in one direction.

Other objects and advantages will become apparent from a consideration of the following detailed description taken in connection with the accompanying drawing wherein a satisfactory embodiment of the invention is shown. It will, of course, be understood that the invention is not limited to the details disclosed but includes all such variations and modifications as fall within the spirit of the invention and the scope of the appended claims to which claims reference is to be had for a definition of the invention.

In the drawing:

Fig. 1 is an elevational view showing a wheel and a portion of the front axle of a vehicle with my improved jack in place beneath the axle and the wheel raised;

Fig. 2 is a view looking from the right in Fig. 1;

Fig. 3 is a perspective view of the attaching bracket portion of the jack;

Fig. 4 is a side elevational view of the upper portion of the ground engaging element of the jack;

Fig. 5 is a view taken at right angles to Fig. 4 parts being shown in section;

Fig. 6 is a transverse sectional view substantially on the line 6—6 of Fig. 4; and Fig. 7 is a sectional view showing the connection between the attaching bracket and the ground engaging element of the jack when the jack is in position supporting a wheel in raised position.

Referring in detail to the drawing at 10 is shown a portion of a front axle of a vehicle and to the axle 10 is applied a wheel 11. A leaf spring 12 is secured to the axle 10 as by means of a bolt 13 passing through the spring and threaded into the axle, and a pair of U-bolts or clips 14 straddling the spring and disposed one at each side of the axle as is usual.

The jack of the present invention includes a bracket or attaching portion 15 and a ground engaging element generally designated 16. Bracket 15 includes a flat elongated body portion 15a having an opening 17 therethrough, and a head 18. This head 18 is provided with a transversely extending opening 19 and a lateral slot 20 leading from an outer surface of the head into the opening 19. As will be clear from Figs. 3 and 7 the opening 19 is off-set upwardly with respect to the slot 20 and the purpose of this arrangement will later appear. Further, the slot 20 inclines downwardly and in the head 18 and arranged at right angles to and traversing the slot 20 is a second slot 21.

The ground engaging element 16 includes a pair of sections 22 and 23 of which the section 23 includes a web-like portion 24 having an eccentric ground engaging surface 25 terminating in a flat portion 26. This ground engaging surface is preferably roughened or serrated whereby to insure a firm grip and prevent slipping of the element on the ground. Section 23 also includes a hollow neck-like portion 27 adapted to telescopically receive the section 22 of the element 16 as best shown in Fig. 5.

The sections 22 and 23 are adapted for relative adjustment whereby the jack may be used in connection with the wheels of different diameters. This adjustment is provided for by the telescopic connection above referred to and in order that the parts may be rigidly held in adjusted position the section 22 may be provided with spaced depressions or openings 28 while the neck-like portion 27 of the section 23 is provided with a tapped opening 29 threadedly receiving the shank of a screw 30. Obviously, the sections are adjusted to bring the desired depression 28 opposite the opening 29 and the screw 30 is then operated to engage in a depression 28 to lock the parts in adjusted position. In the drawing the section 22 is shown as being substantially square in cross section and as being received in an opening of substantially the same shape in the neck 27. This will prevent relative turning movement between the sections.

The upper end portion of the section 22 is rounded off as at 31 and a pin 32 passes through this upper end portion of this section and projects from each side thereof as clearly shown in Fig. 5.

According to the present invention the bracket 15 is secured to the axle 10 or to a vehicle between the axle and the spring by the means which serves to secure the spring to the axle. In the present instance the body portion 15a of the bracket is disposed transversely of the axle 10 and beneath the spring 12 and the bolt 13 in addition to passing through the spring also passes through the opening 17 in the body of the bracket. This secures the bracket to the axle and the U-bolts or clips 14 in addition to straddling the spring also straddle the bracket and maintain the bracket against turning movement about the bolt 13 as a pivot.

When the bracket is attached to the axle as above explained the head 18 of the bracket will, of course, be disposed at one side of the axle and it is preferable that this head be disposed at the outer side of the axle. One bracket 15 will be secured to the vehicle, preferably between the spring and axle, adjacent each wheel of the vehicle. Thus the bracket portion of the jack is more or less permanently attached to the motor vehicle. While each car will be equipped with four of the brackets 15 it will usually be found that but one of the ground engaging elements 16 is necessary and when not in use this latter element will be carried with the tools usually found in an automobile.

When the tire of a wheel is punctured or when for any other reason it is desired to raise or elevate a particular wheel of a motor vehicle equipped with my improved jack structure the ground engaging element 16 will be applied to the bracket 15 adjacent that wheel. The element 16 is applied to the bracket 15 by passing the projecting ends of the pin 32 through the lateral slot 20 to dispose the end portions of the pin in the opening 19. The slot 21 accommodates the end portion of the section 22 of the element 16 and the pins have bearing in the opening 19 and the elements may be rocked relatively within the limits defined by the end walls of the slot 21.

With the pin 32 disposed in the opening 19 the end of the surface 25 opposite the flat 26 will be in engagement with the ground and the wheel adjacent the bracket being used will be elevated by driving the vehicle forwardly or backwardly a short distance depending on which side of the axle the jack is placed. During this short movement the element 16 will rock on its eccentric surface 25 and onto its flat 26 and the wheel is raised or elevated. When the parts are in this position the pin 32 will be directly over the flat 16 and the distance between these parts is such that the wheel will be raised off the ground. Further, owing to the fact that the opening 19 is off-set upwardly somewhat with respect to the slot 20 the pressure or weight of the car on the pin 32 will serve only to press the pin against the upper wall of the opening and the parts are thereby locked together.

As the jack is rocked into operative position or into a position to elevate and maintain elevated a wheel, the upper end portion of the section 22 of the ground engaging element will, of course, change its position in the slot 21 and when the jack is resting on the flat 26 the said portion of the section 22 will have engaged the limiting or stop shoulder 33 formed by the inner wall of the slot 21. To lower the wheel off the jack it is but necessary to drive the vehicle a slight distance in a direction opposite to that in which it was driven to raise the wheel and the jack will then rock in the opposite direction on its surface 25 and owing to the downward inclination of the slot 20 the pin 32 will drop out of the head 18 and the element 16 may be picked up and returned to the tool chest or the like.

From the foregoing description it will be seen that I have provided a jack structure which is simple in construction and comprises but a few parts each of which is of rugged construction and not likely to become broken in use. Further, it will be seen that a wheel of a vehicle may be elevated with very little manual effort and that the jack may easily and quickly be placed in position for operation and that when the vehicle is moved to lower the same the ground engaging portion of the jack is automatically disconnected from that portion of the jack which is attached to the vehicle.

Having thus set forth the nature of my invention, what I claim is:

1. In a jack for motor vehicles, in combination, a bracket adapted to be secured to an axle of the vehicle adjacent a wheel thereof, said bracket including a head having a transversely extending opening therein and a lateral slot entering the opening, a ground engaging element having an eccentric ground engaging surface terminating in a flat, said element including a pin adapted to be passed through the lateral slot and into the transverse opening in the head and have bearing therein, said opening being off-set upwardly relative to the slot whereby to form a lock for the pin, said ground engaging element adapted to rock on its eccentric surface and onto its flat to elevate and maintain elevated a wheel of the vehicle when the pin of the element is in the opening of the bracket and the vehicle is moved in the direction of the element and said slot inclining downwardly whereby the pin will fall out of the opening and slot on the vehicle moving in a direction away from the element in the lowering of the wheel.

2. In a jack for motor vehicles, in combination, a bracket adapted to be secured to an axle of the vehicle adjacent a wheel thereof, said bracket including a head having a transversely extending opening therein and a lateral slot entering the opening, said head having a second slot at right angles to and traversing the first mentioned slot and leading into the opening, a ground engaging element having an eccentric ground engaging surface terminating in a flat, a pin extending from opposite sides of an end portion of said element, said pin adapted to be passed through the first mentioned slot and into the opening in the head and having bearing therein, said end portion of the element adapted to enter the second slot and be movable therein within the limits defined by the end walls of the slot, said transverse opening being off-set upwardly relative to the first mentioned slot whereby to form a lock for the pin, said ground engaging element adapted to rock on its eccentric surface and onto its flat to elevate and maintain elevated a wheel of the vehicle when the pin of the element is in the opening in the head of the bracket and the vehicle is moved in the direction of the element, said end portion of the element adapted to co-operate with an end wall of the second mentioned slot when the vehicle is moved to engage the flat of the element with the ground, and said first mentioned slot inclining downwardly whereby the pin will fall out of the opening and first mentioned slot on the vehicle moving in a direction away from the element in the lowering of the vehicle.

3. In a jack for motor vehicles, in combination, a bracket adapted to be secured to an axle of the vehicle, said bracket including a head having a transversely extending opening therein and a lateral slot entering the opening, a ground engaging element having a ground engaging surface, said element including a pin adapted to be passed through the lateral slot and into the transverse opening in the head and having bearing therein, said opening being offset upwardly relative to the slot whereby to form a lock for the pin, said ground engaging element adapted to rock on its surface to elevate and maintain elevated a wheel of the vehicle when the pin of the element is in the opening of the bracket and the vehicle is moved in the direction of the element and said slot inclining downwardly whereby the pin will fall out of the opening and slot on the vehicle moving in a direction away from the element after lowering of the wheel.

4. In a jack for motor vehicles, in combination, a bracket adapted to be secured to an axle of the vehicle, said bracket including a head having a transversely extending opening therein and a lateral slot entering the opening, said head having a second slot at right angles to and traversing the first mentioned slot and leading into the opening, a ground engaging element having a ground engaging surface, a pin extending from opposite sides of an end portion of said element, said pin adapted to be passed through the first mentioned slot and into the opening in the head and having bearing therein, said end portion of the element adapted to enter the second slot and be movable therein within the limits defined by the end walls of the slot, said transverse opening being offset upwardly relative to the first mentioned slot whereby to form a lock for the pin, said ground engaging element adapted to rock on its surface to elevate and maintain elevated a wheel of the vehicle when the pin of the element is in the opening in the head of the bracket and the vehicle is moved in the direction of the element, said end portion of the element adapted to co-operate with an end wall of the second mentioned slot when the vehicle is elevated, and said first mentioned slot inclining downwardly whereby the pin will fall out of the opening and first mentioned slot on the vehicle moving in a direction away from the element after lowering of the vehicle.

5. In a jack for motor vehicles, in combination, a bracket adapted to be secured to an axle of the vehicle, said bracket including a head having a transversely extending opening therein and a lateral slot entering the opening, a ground engaging element having a ground engaging surface, said element including a pin adapted to be passed through the lateral slot and into the transverse opening in the head and have bearing therein, said ground engaging element adapted to rock on its ground engaging surface and elevate a wheel of the vehicle when the pin of the element is in the opening of the bracket and the vehicle is moved in the direction of the element, a stop on the bracket to engage the element and bind the pin against the side of the opening to maintain the wheel in elevated position, and said slot inclining downwardly from the opening whereby the pin will fall out of the opening and slot on the vehicle moving in a direction away from the element after lowering of the wheel.

6. In a jack for motor vehicles, in combination, a bracket adapted to be secured to an axle of the vehicle, said bracket including a head having a transversely extending opening therein and a lateral slot entering the opening, a ground engaging element having a ground engaging surface, said element including a pin adapted to be passed through the lateral slot and into the transverse opening in the head and have bearing therein, said opening being offset upwardly relative to the slot whereby to form a lock for the pin, said ground engaging element adapted to rock on its ground engaging surface to elevate a wheel of the vehicle when the pin of the element is in the opening of the bracket and the vehicle is moved in the direction of the element, and a stop on the bracket to engage the element and limit turning movement thereof and lock the pin in the offset portion of the opening to maintain the wheel elevated.

In testimony whereof I affix my signature.

LOUIS M. CORTIGIANO.